United States Patent Office 3,076,015
Patented Jan. 29, 1963

3,076,015
PREPARATION OF [2-CYANO-3-ALKOXY (OR HYDROXY)]THIO-2-ALKENAMIDES
Marvin A. McCall and Newton H. Shearer, Jr., Kingsport, Tenn., assignors to Eastman Kodak Company, Rochester, N.Y., a corporation of New Jersey
No Drawing. Filed Aug. 18, 1960, Ser. No. 50,307
14 Claims. (Cl. 260—465.5)

This invention relates to cyanothioamides having the following general structure:

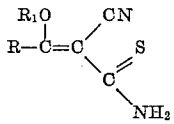

wherein each of R and $R_1$ represents a hydrogen atom or an alkyl group containing from 1 to 5 carbon atoms, e.g., methyl, ethyl, propyl, isopropyl, butyl, sec. butyl amyl, etc., groups.

The above defined new class of compounds are useful intermediates for the preparation of pesticides. They are also useful as rodent repellents. They are somewhat toxic to mammals but in view of our present tests are not considered highly toxic. For example, 2-cyano-3-ethoxy-thiocrotonamide (Example 2) was found to have an LD50 on rats of 89 mg./kg. This degree of toxicity may account for its effectiveness as a rodent repellent since smaller dosages (63 mg.&kg.) were effective in causing general weakness, decreased activity and loss of coordination. These compounds are also physiologically active to man. They possess irritant properties that tend to cause the face to flush, resulting in rosy cheeks even with very mild exposure. These compounds are potentially useful as drugs and drug intermediates. Their value as intermediates is potentially very important because of the large number of active functional groups found in these new compositions. For example, each molecule contains a thioamide, a cyano, an alkoxy or hydroxy and an unsaturated group.

It is, accordingly, an object of the invention to provide a new class of cyanothioamide compounds as defined above. Another object is to provide useful intermediates for the preparation of pesticides and pharmaceutical preparations. Another object is to provide a method for preparing the new compounds. Other objects will become apparent hereinafter.

In accordance with the invention, we prepare our new cyanothioamides by one or more methods. For example, they may be prepared (Method A) by reacting an alkoxyalkylidene malonitrile with hydrogen sulfide in a dry inert solvent medium such as benzene, toluene, heptane, or other inert aromatic or aliphatic hydrocarbon solvent according to the following reaction scheme:

A. 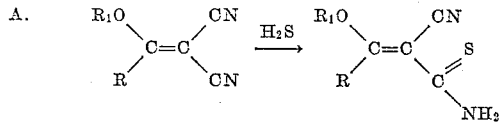

wherein each of R and $R_1$ are as previously defined. The intermediate alkoxyalkylidene malononitriles may be prepared as described by Diels et al., Ber., 55, p. 3441; Jones, J. Amer. Chem. Coc., 74, p 4489 (1952), which can then be hydrolyzed in aqueous alkali metal hydroxide such as sodium or potassium hydroxide to provide the corresponding intermediate hydroxyalkylidene malononitriles. The intermediates can also be prepared as described by F. Bergel et al., U.S. Patent No. 2,375,185, issued May 8, 1945. Suitable alkoxyalkylidene malononitriles includes the methoxy-, ethoxy-, propoxy-, butoxy-, pentoxy-, etc. ethylidene malononitriles, propylidene malononitriles, etc.

The compounds of the invention may also be prepared by (Method B) reacting the appropriate trialkyl orthoester with 2-cyanothioacetamide in glacial acetic acid or other suitable solvent as follows:

B. 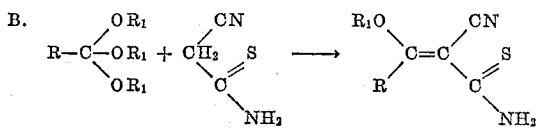

wherein R is as previously defined and each $R_1$ is an alkyl group of 1 to 5 carbon atoms. Suitable trialkyl orthoesters include triethyl orthoacetate, trimethyl orthoacetate, tributyl orthoacetate, triamyl orthoacetate, etc., and corresponding propionates, butyrates, valerates, etc. Another method for preparing the compounds of the invention, wherein $R_1$ in the final product in hydrogen, is to react the appropriate [2-cyano-3alkoxy]-thio-2-alkenamide, obtained by either of the above Methods A or B, with boiling water or better by dissolving in a dilute base such as an aqueous alkali metal hydroxide, followed by precipitation with acid. The following scheme illustrates the reaction:

C. 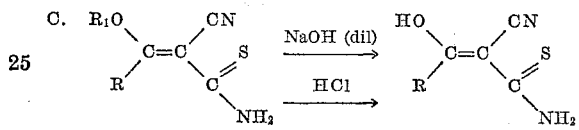

wherein R is as previously defined and $R_1$ is an alkyl group of from 1 to 5 carbon atoms. The above described reactions may be effectively carried out over a relatively wide temperature range, for example, from 15° to 100° C. or higher, at pressures ranging from below atmospheric to above atmospheric, but preferably at prevailing atmospheric pressures. The proportions of reactants can also be varied over a relatively wide range, e.g. from 1:2 to 2:1, but preferably approximately equimolar proportions are employed. Method A is the preferred method for preparing the compounds of the invention.

The following examples will serve further to illustrate the new class of cyanothioamide compounds of the invention and the manner of preparing the same.

EXAMPLE 1

(2-Cyano-3-Ethoxy)Thiocrotonamide (Method A)

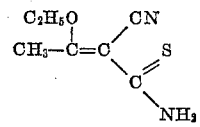

13.6 g. (0.1 mole) of ethoxyethylidene malononitrile (M.P. 90 to 91° C.) was dissolved in 125 cc. of dry benzene and a few drops of triethyl amine added as catalyst. To this stirred solution was added $H_2S$ until a solid formed. The solid was removed by filtration and the filtrate treated again with $H_2S$. This procedure was repeated several times. The total solid amounted to 12.3 g., M.P. 166–167° C. On recrystallization from ethyl alcohol the product melted at 175–177° C. Analysis.—Calcd. for $C_7H_{10}N_2OS$: C, 49.42; H, 5.92; N, 16.46; S, 18.83. Found: C, 49.53; H, 6.11; N, 16.12; S,18.53.

In place of the ethoxyethylidene malononitrile, there may be substituted an equivalent amount of methoxyethylidene malononitrile to give (2-cyano-3-methoxy)-thiocrotonamide; propoxyethylidene malononitrile to give (2-cyano-3-propoxy)thiocrotonamide; pentoxyethylidene malononitrile to give (2-cyano-3-pentoxy)thiocrotonamide; methoxypropylidene malononitrile to give (2-cyano-3-methoxy)thio-2 pentenamide; methoxypentylidene malononitrile to give (2-cyano-3-methoxy)thio-2-heptenamide; and the like.

EXAMPLE 2

*(2-Cyano-3-Ethoxy)Thiocrotonamide (Method B)*

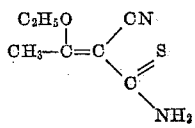

16.2 g. (0.1 mole) triethyl orthoacetate and 10.0 g. (0.1 mole) of α-cyanothioacetamide were mixed with 5 to 6 cc. of glacial acetic acid. The mixture was warmed on a steam bath for 10–15 minutes. During this time the solid starting material appeared to discolor and a new solid precipitate formed. The solution turned dark orange and was allowed to stand for approximately 10 minutes, then filtered, 11.0 g. of the same product as Example 1 was obtained.

EXAMPLE 3

*(2-Cyano-3-Ethoxy)Thioacrylamide*

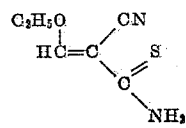

17.7 g. (0.1 mole+20%) triethyl orthoformate and 10.0 g. (0.1 mole) of 2-cyanothioacetamide were mixed with 5 to 6 cc. of glacial acetic acid and warmed on the steam bath. The solid product was dark red and decomposed rather than melt. It was quite soluble in the usual solvents and very difficult to purify. Analysis indicated this product to be a mixture of two geometrical isomers of (2-cyano-3-ethoxy)thioacrylamide.

EXAMPLE 4

*(2-Cyano-3-Ethoxy)Thio-2-Pentenamide*

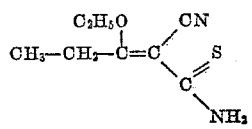

21.1 g. (0.1 mole+20%) triethyl orthopropionate and 10.0 g. of 2-cyanothioacetamide were mixed with 5 to 8 cc. of glacial acetic acid and warmed on the steam bath until all the solid went into solution (5–10 minutes). The dark red solution was set aside for 5–10 minutes to crystallize. The orange crystals were recrystallized from ethanol yielding yellow crystals, M.P. 130 to 132° C. Calcd. for $C_8H_{12}N_2OS$: C, 52.17; H, 6.52; N, 15.22; S, 17.39. Found: C, 51.88; H, 6.84; N, 15.27; S, 17.12.

This same product was obtained by reacting $H_2S$ with ethoxy propylidene malononitrile according to procedure used in Example 1 (Method A).

EXAMPLE 5

*(2-Cyano-3-Methoxy)Thiocrotonamide*

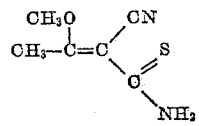

14.4 g. (0.1 mole+25%) trimethyl orthoacetate and 10.0 g. of 2-cyanothioacetamide were mixed with 5 to 6 cc. of glacial acetic acid and warmed on the steam bath for approximately 5 minutes. The filtered product was washed with ether and melted at 134 to 137° C. It was recrystallized from methyl alcohol. This purified product slowly darkened and finally melted at about 230° C. with decomposition. *Analysis.*—Calcd. for $C_6H_8N_2OS$: C, 46.15; H, 5.13; N, 17.95; S, 20.51. Found: C, 46.38; H, 5.18; N, 18.18; S, 20.61.

EXAMPLE 6

*(2-Cyano-3-Methoxy)Thio-2-Heptenamide*

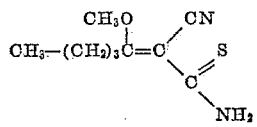

18.2 g. (0.1 mole+10%) trimethyl ortho-n-valerate and 10.0 g. 2-cyanothioacetamide were mixed with 2–3 cc. of glacial acetic acid and warmed on the steam bath for approximately 5 minutes. The reaction mixture dissolved and the new product formed. It was worked up in the same manner as described in the above examples. *Analysis.*—Calcd. for $C_9H_{14}N_2OS$: C, 54.51; H, 7.12. Found: C, 54.26; H, 6.99.

This same product was obtained when $H_2S$ was reacted with (2-cyano-3-methoxy)-2-heptenomalononitrile according to the procedure given in Example 1 (Method A).

EXAMPLE 7

*(2-Cyano-3-Pentoxy)Thiocrotonamide*

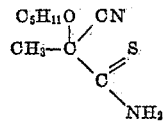

(0.1 mole+20%) triamylorthoacetate and 10 g. (0.1 mole) 2-cyanothioacetamide were mixed with 6 cc. of glacial acetic acid and heated on a steam bath until the 2-cyanothioacetamide was dissolved and a new semisolid oily material had formed. This new product was isolated by cooling in Dry Ice and acetone and filtering. *Analysis.*—Calcd. for $C_{10}H_{16}N_2OS$: C, 56.57; H, 7.60. Found: C, 56.46; H, 7.48.

EXAMPLE 8

*(2-Cyano-3-Hydroxy)Thiocrotonamide (Method C)*

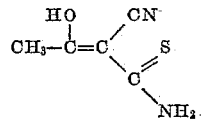

26 g. (0.153 mole) of (2-cyano-3-ethoxy)thiocrotonamide was dissolved in 150 cc. of 4% aqueous NaOH, then reprecipitated by making the solution acid with 10% HCl. The solid precipitate was filtered, washed with a little water and dried. The solid (20.3 g.) was recrystallized from ethanol, M.P. 147–148° C. *Analysis.*—Calcd. for $C_5H_6N_2OS$: C, 42.24; H, 4.25; N, 19.71; S, 22.55. Found: C, 42.16; H, 4.09; N, 19.77; S, 23.63. The same product was formed when (2-cyano-3-methoxy)thiocrotonamide (product from Example 5) was reacted in the above manner.

In a similar manner to that described in Example 8 above other valuable hydroxy derivatives were prepared in the following examples 9 and 10.

EXAMPLE 9

*(2-Cyano-3-Hydroxy)Thio-2-Pentenamide*

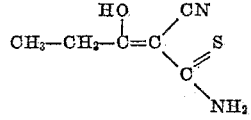

was prepared from the product obtained from Example 4. M.P. 84–85° C. *Analysis.*—Calcd. for $C_6H_8N_2OS$: C, 46.13; H, 5.16; N, 17.93. Found: C, 46.21; H, 5.08; N, 17.98. Process of Example 8 used.

EXAMPLE 10

*(2-Cyano-3-Hydroxy)Thio-2-Heptenamide*

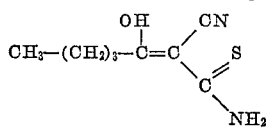

was prepared from the product obtained from Example 6 following the procedure of Example 8.

EXAMPLE 11

The above materials were tested as rodent repellents according to a food acceptance technique which is described in the following publication: Rodent Repellent Studies, I. Development of an Index Number for Expressing Degrees of Repellent Activity, by E. Bellach, J. B. DeWitt, J. Am. Pharm. Soc. (Sci. Ed.), 38, 109–112 (1949). An index number greater than 85 is indicative of rodent repellent action and 100 is the highest possible index on the scale used. The index numbers reported here are based on tests where the food contained a 2% concentration of the test material. It should be noted that the repellents do not have to be mixed with the food in practical applications. They may be incorporated into or onto the packaging material such as burlap bags, cardboard or even plastic bags. A further practical use is in coating seeds in large scale seeding operations to prevent the seeds from being eaten by rodents before they have time to sprout and grow.

| Compound: | Repellent Index |
|---|---|
| (2-Cyano-3-ethoxy)thiocrotonamide | 98 |
| (2-Cyano-3-hydroxy)thiocrotonamide | 88 |
| (2-Cyano-3-ethoxy)thioacrylamide | 89 |
| (2-Cyano-3-ethoxy)thio-2-pentenamide | 95 |
| (2-Cyano-3-hydroxy)thio-2-pentenamide | 90 |
| (2-Cyano-3-ethoxy)thio-2-heptenamide | 92 |
| (2-Cyano-3-hydroxy)thio-2-heptenamide | 94 |

In like manner other compounds coming within the invention can be shown to be active as rodent repellents.

By following the descriptions of the examples, other cyanothioamides coming within the defined scope of the invention can be readily prepared. These also have similar utility as rodent repellents and as intermediates for the preparation of other valuable compounds.

The invention has been described in detail with particular reference to preferred embodiments thereof, but it will be understood that variations and modifications can be effected within the spirit and scope of the invention as described hereinabove and as defined in the appended claims.

What we claim is:

1. A compound represented by the following general formula:

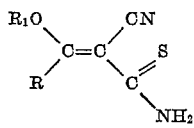

wherein each of R and $R_1$ represents a member selected from the group consisting of a hydrogen atom and an alkyl group containing from 1 to 5 carbon atoms.

2. (2-cyano-3-ethoxy)thiocrotonamide.
3. (2-cyano-3-hydroxy)thiocrotonamide.
4. (2-cyano-3-methoxy)thio-2-heptenamide.
5. (2-cyano-3-hydroxy)thio-2-heptenamide.
6. (2-cyano-3-pentoxy)thiocrotonamide.
7. A process for preparing a compound having the general formula:

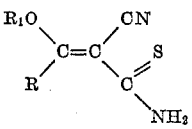

wherein each of R and $R_1$ represents a member selected from the group consisting of a hydrogen atom and a alkyl group containing from 1 to 5 carbon atoms, which comprises reacting a malononitrile derivative having the general formula:

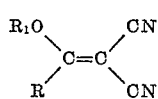

wherein each of R and $R_1$ are as defined above, with $H_2S$ in the proportions of 1 mole of the said malononitrile derivative with at least 1 mole of the said $H_2S$, in an anhydrous inert hydrocarbon solvent medium at a temperature of from 15–100° C.

8. A process for preparing a (2-cyano-3-alkoxy)thio-2-alkenamide which comprises reacting 1 molecular proportion of a malononitrile derivative having the general formula:

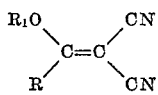

wherein each of R and $R_1$ represents a member selected from the group consisting of a hydrogen atom and a alkyl group containing from 1 to 5 carbon atoms, with $H_2S$, in the proportions of 1 mole of the said malononitrile derivative with at least 1 mole of the said $H_2S$, in an anhydrous inert hydrocarbon solvent medium at temperature of from 15–100° C.

9. A process for preparing (2-cyano-3-ethoxy)thiocrotonamide which comprises reacting 1 molecular proportion of ethoxyethylidene malononitrile with at least molecular proportion of hydrogen sulfide, in an anhydrous inert hydrocarbon solvent medium.

10. The process of claim 9 wherein the said (2-cyano-3-ethoxy)thiocrotonamide is hydrolyzed with aqueous alkali metal hydroxide to yield (2-cyano-3-hydroxy)thiocrotonamide.

11. A process for preparing (2-cyano-3-methoxy)thio-2-heptenamide which comprises reacting 1 molecular proportion of methoxyethylidene malononitrile with at least 1 molecular proportion of hydrogen sulfide, in an anhydrous inert hydrocarbon solvent medium.

12. The process of claim 11 wherein the said (2-cyano-3-methoxy)thio-2-heptenamide is hydrolyzed with aqueous alkali metal hydroxide to yield (2-cyano-3-hydroxy)thio-2-heptenamide.

13. A process for preparing (2-cyano-3-pentoxy)thiocrotonamide which comprises reacting 1 molecular proportion of pentoxyethylidene malononitrile with at least molecular proportion of hydrogen sulfide, in an anhydrous inert hydrocarbon solvent medium.

14. The process of claim 13 wherein the said (2-cyano-3-pentoxy)thiocrotonamide is hydrolyzed with an aqueous alkali metal hydroxide to yield (2-cyano-3-hydroxy)thiocrotonamide.

No references cited.